United States Patent [19]

Pauls et al.

[11] Patent Number: 5,427,699
[45] Date of Patent: Jun. 27, 1995

[54] LOW VISCOSITY ACID-IN-OIL EMULSIONS AND METHODS

[75] Inventors: Richard W. Pauls; William G. F. Ford; Keith H. Hollenbeak, all of Duncan, Okla.

[73] Assignee: Halliburton Company, Duncan, Okla.

[21] Appl. No.: 241,529

[22] Filed: May 12, 1994

Related U.S. Application Data

[62] Division of Ser. No. 973,302, Nov. 6, 1992, Pat. No. 5,355,958.

[51] Int. Cl.$^6$ .............................................. E21B 43/27
[52] U.S. Cl. .................................. 507/244; 507/937; 252/356; 252/357
[58] Field of Search ........................................ 252/8.553

[56] References Cited

U.S. PATENT DOCUMENTS

| | | |
|---|---|---|
| 2,681,889 | 6/1954 | Menaul et al. . |
| 3,343,602 | 9/1967 | Knox et al. . |
| 3,860,430 | 1/1975 | Walker et al. . |
| 3,923,100 | 12/1975 | Bellos et al. . |
| 4,140,640 | 2/1979 | Scherubel . |
| 5,034,140 | 7/1991 | Gardner et al. . |

*Primary Examiner*—Gary Geist
*Assistant Examiner*—Valerie Fee
*Attorney, Agent, or Firm*—Robert A. Kent; C. Clark Dougherty, Jr.

[57] ABSTRACT

The present invention provides low viscosity acid-in-oil emulsions, surfactant systems and methods of using the emulsions and surfactants for stimulating the production of hydrocarbons from subterranean producing formations. The low viscosity acid-in-oil emulsions are basically comprised of a hydrocarbon oil forming the external phase of the emulsion, an emulsifying agent of a type which forms and stabilizes an acid-in-oil emulsion, an emulsion viscosity reducing agent comprising a fatty ammonium salt of a fatty acid and an aqueous acid solution forming the internal phase of the emulsion.

16 Claims, No Drawings

LOW VISCOSITY ACID-IN-OIL EMULSIONS AND METHODS

This application is a division of application Ser. No. 07/973,302, filed Nov. 6, 1992 now U.S. Pat. No. 5,355,958.

BACKGROUND OF THE INVENTION

1. Field of the Invention

The present invention relates to acid-in-oil emulsions and methods of stimulating the production of hydrocarbons from subterranean formations using such emulsions.

2. Description of the Prior Art

The use of aqueous acid solutions to stimulate the production of hydrocarbons from subterranean formations having naturally low permeabilities is well known. Typically, an aqueous acid solution is pumped through the well bore into the formation where it reacts with materials in the formation to increase the permeability thereof. The increased permeability brings about an increase in the flow of hydrocarbons from the formation into the well bore.

When a formation having naturally low permeability is contacted with an aqueous acid solution, the acid solution rapidly diffuses and reacts with the materials making up the formation. As a result, the delivery of the acid solution deeply and uniformly into the formation before it spends is often difficult or impossible. In as much as the flow of hydrocarbons in formations having low permeabilities is only increased in those areas to which unspent acid is delivered, any increase in hydrocarbon production is proportional to the distance from the well bore .reached by unspent acid.

A variety of acid compositions and methods have been developed whereby the rates of acid diffusion and acid spending are retarded and unspent acid flows greater distances within a formation being treated. A particularly advantageous such composition is an acid-in-oil emulsion which is retarded as a result of oil being the external phase and acid the internal phase. The external oil phase provides a barrier to the diffusion and spending of the acid allowing unspent acid to be delivered deeply and uniformly into a formation. However, while acid-in-oil emulsions have been effective in acidizing some formations, they have been relatively ineffective in other formations having naturally low permeabilities. A principle reason for such ineffectiveness is that acid-in-oil emulsions have relatively high viscosities which often prevent them from being pumped through a well bore and into a formation to be treated at a high enough rate. That is, the high friction pressure of a viscous emulsion often increases the injection pressure whereby the desired rate can not be pumped without exceeding the pressure limits of tubular goods and other equipment. Another problem in the use of prior acid-in-oil emulsions relates to the reactivity of the acid in low temperature formations, i.e., temperatures in the range of from about 50° F. to about 150° F. At such low temperatures, the acid generally has a low reactivity with formation materials in the presence of oil which prevents the acid from substantially increasing the permeability of the formation.

Thus, there is a need for improved well acidizing compositions and methods whereby the acidizing compositions have low viscosities, are retarded so that unspent acid can be efficiently delivered deeply and uniformly into the formation and the acid reacts with the materials making up the formation in the presence of oil at a rate sufficient to effectively increase the permeability of the formation and the production of hydrocarbons therefrom.

SUMMARY OF THE INVENTION

The present invention provides low viscosity acid-in-oil emulsions, surfactants for forming such emulsions and methods of using the emulsions and surfactants in the acid stimulation of subterranean formations which meet the needs recited above and overcome the shortcomings of the prior art.

In one aspect, the present invention provides a surfactant system for preparing a low viscosity acid-in-oil emulsion. The surfactant system comprises an emulsifying agent of a type which promotes the formation of and stabilizes an acid-in-oil emulsion, and an emulsion viscosity reducing agent comprising an electro-neutral fatty ammonium salt of a fatty acid. The surfactant system can be premixed and combined with the oil utilized prior to combining an aqueous acid solution with the oil and forming an acid-in-oil emulsion therefrom. Alternatively, the individual components making up the surfactant system can be added to the oil, or the emulsifying agent and compounds which react to form the electro-neutral emulsion viscosity reducing agent can be added to the oil prior to forming the emulsion.

In another aspect of the present invention, acid-in-oil emulsions having low viscosities and high acid reactivities when in contact with carbonate formation materials are provided. Such acid-in-oil emulsions are basically comprised of a hydrocarbon oil forming the external phase of the emulsion, an emulsifying agent of a type which forms and stabilizes an acid-in-oil emulsion, an emulsion viscosity reducing agent comprising a fatty ammonium salt of a fatty acid and an aqueous acid solution forming the internal phase of the emulsion.

In yet another aspect of the present invention, methods of reducing the viscosity of an acid-in-oil emulsion comprising combining an emulsion viscosity reducing agent of this invention with the emulsion are provided. In still another aspect, methods of stimulating the production of hydrocarbons from a subterranean formation penetrated by a well bore are provided. The methods basically comprise the steps of pumping a low viscosity acid-in-oil emulsion of this invention into the formation by way of the well bore whereby the acid in the emulsion reacts with materials in the formation to increase the permeability thereof and recovering the resulting spent acid from the formation.

It is, therefore, a general object of the present invention to provide improved low viscosity acid-in-oil emulsions, surfactants for producing such emulsions and methods of using the emulsions and surfactants.

Other and further objects, features and advantages of the present invention will be readily apparent to those skilled in the art upon a reading of the description of preferred embodiments which follows.

DESCRIPTION OF PREFERRED EMBODIMENTS

The present invention provides a liquid surfactant system for preparing a low viscosity acid-in-oil emulsion useful in acid stimulating subterranean hydrocarbon producing formations, particularly formations having low temperatures and naturally low permeabilities. The surfactant system can be utilized at the well site to form a low viscosity acid-in-oil emulsion by combining it with the oil used followed by mixing the aqueous acid solution used with the oil to form the emulsion. The surfactant system can be premixed or the individual components of the surfactant system can be added separately to the oil prior to preparing the emulsion or compounds which react in oil to form one or more components of the surfactant system can be separately added to the oil prior to preparing the emulsion. The term "low viscosity" when referring to the acid-in-oil emulsions of this invention means that the emulsions have apparent viscosities in the range of from about 15 cp to about 50 cp measured using a Fann Model 35 viscometer equipped with a No. 1 bob, sleeve and spring and operated at 300 rpm.

The surfactant system of this invention is basically comprised of an emulsifying agent and an emulsion viscosity reducing agent. The emulsifying agent can be any of various emulsifying surfactants which do not adversely react with or otherwise affect the emulsion viscosity reducing agent and which function to form and stabilize an aqueous acid internal phase-hydrocarbon oil external phase emulsion. Examples of suitable such emulsifying agents are fatty alkanol amides and a blend of an amphoteric amine salt, a phosphate ester, an ethoxylated dialkyl phenol and a propylene glycol ether. The most preferred emulsifying agent for use in accordance with this invention is oleic diethanol amide. Such an emulsifying agent is commercially available from the Witco Chemical Corporation of Houston, Tex., under the tradename Witcamide® 511.

The emulsion viscosity reducing agent is a surfactant comprised of an electro-neutral fatty ammonium salt of a fatty acid. Such an electro-neutral surfactant can be prepared by reacting a fatty amine with glacial acetic acid in a low molecular weight alkyl alcohol to produce an intermediate fatty amine acetate. The solution of the acetate can then be reacted with a hydrocarbon solution of a fatty acid to yield a solution of the electro-neutral fatty ammonium salt of a fatty acid. Alternatively, the fatty amine acetate intermediate product can be obtained commercially and reacted directly with the fatty acid to form the emulsion viscosity reducing agent.

The emulsion viscosity reducing agent, i.e., the electro-neutral fatty ammonium salt of the fatty acid has the following structural formula:

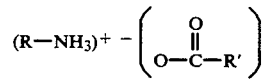

wherein R and R' are the same or different saturated or unsaturated aliphatic groups having in the range of from about 8 to about 22 carbon atoms. In a more preferred emulsion viscosity reducing agent of the above structural formula, R and R' are the same or different, R is a saturated aliphatic group having in the range of from about 10 to about 14 carbon atoms and R' is a saturated aliphatic group having in the range of from about 10 to about 14 carbon atoms.

Examples of preferred electro-neutral surfactants for use as emulsion viscosity reducing agents in accordance with this invention are the tallow ammonium salt of coco fatty acid, the coco ammonium salt of oleic fatty acid, the coco ammonium salt of coco fatty acid and the like. Of these, the coco ammonium salt of coco fatty acid is the most preferred.

As indicated above, the surfactant system comprised of an emulsifying agent and an emulsion viscosity reducing agent can be preformed and used as a unitary liquid additive, or the individual components or reactants forming the components can be added to the oil used prior to mixing the acid with the oil and forming the emulsion. In either case, the emulsifying agent is generally present in the surfactant system in an amount in the range of from about 5% to about 9.5% by volume of the system excluding any solvent or solvents present, preferably in an amount of about 30% by volume. The emulsion viscosity reducing agent comprised of a fatty ammonium salt of a fatty acid is present in the system in an amount in the range of from about 5% to about 9.5% by volume of the system excluding any solvent or solvents present, preferably in an amount of about 70% by volume.

The most preferred surfactant system of this invention for preparing a low viscosity acid-in-oil emulsion is comprised of a oleic diethanol amide emulsifying agent present in the system in an amount of about 30% by volume of the system excluding any solvent or solvents present, and a coco ammonium salt of coco fatty acid emulsion viscosity reducing agent present in the system in an amount of about 70% by volume of the system excluding any solvent or solvents present.

While various techniques can be utilized for forming a low viscosity acid-in-oil emulsion of this invention using the above described surfactant system, as mentioned above the preferred technique is to combine the surfactant system in a preformed solution or as individual components or reactants with the oil utilized followed by mixing the aqueous acid solution used to thereby form the emulsion.

The acid-in-oil emulsion formed as described above is basically comprised of a hydrocarbon oil forming the external phase of the emulsion present in the emulsion in an amount in the range of from about 5% to about 48% by volume thereof, an emulsifying agent of a type which forms and stabilizes an acid-in-oil emulsion present in the emulsion in an amount in the range of from about 0.01% to about 2.0% by volume thereof, an emulsion viscosity reducing agent comprising a fatty ammonium salt of a fatty acid present in the emulsion in an amount in the range of from about 0.01% to about 2.0% by volume thereof and an aqueous acid solution forming the internal phase of the emulsion present in the emulsion in an amount in the range of from about 5% to about 48% by volume thereof.

The hydrocarbon oil forming the external phase of the emulsion can be any low viscosity hydrocarbon liquid. Preferred such liquids are kerosene, diesel oil, lease crude and naphtha. Of these, diesel oil is the most preferred hydrocarbon oil for use in preparing the acid-in-oil emulsion of this invention. The emulsifying agent and the emulsion viscosity reducing agent in the acid-in-oil emulsion of this invention are those described above, and the aqueous acid solution which forms the internal phase of the emulsion can be any suitable aqueous acid solution. Examples of suitable aqueous acid solutions are aqueous solutions of acetic acid, formic acid, hydrochloric acid or mixtures of such acids, with an aqueous solution of hydrochloric acid being the most preferred. While the aqueous acid solution can be of any desired concentration, it generally has a concentration in the range of from about 1% to about 38% by weight of the solution. The aqueous acid solution can also contain one or more additives such as metal corrosion inhibitors, etc.

The most preferred acid-in-oil emulsion for acid stimulating subterranean carbonate formations of low temperature and permeability is comprised of diesel oil forming the external phase of the emulsion present in the emulsion in an amount of about 30% by volume thereof, an oleic diethanol amide emulsifying agent present in the emulsion in an amount of about 0.15% by volume thereof, a coco ammonium salt of a coco fatty acid viscosity reducing agent present in the emulsion in an amount of about 0.35% by volume and an aqueous hydrochloric acid solution containing hydrochloric acid in an amount of about 28% by weight of solution forming the internal phase of the emulsion present in the emulsion in an amount of about 69.5% by volume thereof.

In carrying out the methods of the present invention for stimulating the production of hydrocarbons from a subterranean formation penetrated by a well bore, a low viscosity acid-in-oil emulsion of this invention is pumped into the formation by way of the well bore whereby the acid in the emulsion reacts with materials in the formation to increase the permeability thereof, and then recovering the resulting spent acid from the formation. As mentioned above, the acid-in-oil emulsions of this invention have low viscosities whereby they can be pumped at required flow rates into formations being stimulated without excessive pump discharge pressures or flowing pressures being developed. Also, because of the presence of the electro-neutral emulsion viscosity reducing agent which also functions as a wetting agent, the acid-in-oil emulsions of this invention have high reactivities with formation materials even at very low temperatures.

Finally, the viscosity of an acid-in-oil emulsion containing any of a variety of surfactant emulsifying agents can be reduced in accordance with this invention by combining an electro-neutral emulsion viscosity reducing agent of the type described above therewith in an amount in the range of from about 0.01% to about 2.0% by volume of the emulsion.

In order to further illustrate the emulsions, surfactants and methods of this invention, the following example is given.

EXAMPLE

A variety of acid-in-oil emulsions of this invention were prepared as follows: 150 milliliters of kerosene were placed in a 1000 milliliter Waring blender jar. As the kerosene was being stirred in the blender jar at approximately 25% of maximum speed, the emulsifier used, the fatty amine used, glacial acetic acid and isopropyl alcohol were added to the kerosene. The quantities of the components added to the kerosene were 25% by volume emulsifier, 50% by volume fatty amine, 6% by volume glacial acetic acid and 44% by volume isopropyl alcohol. After additional mixing, a quantity of a fatty acid was added to the reaction mixture. 350 milliliters of an aqueous hydrochloric acid solution containing 15% by weight hydrochloric acid and 0.2% by volume of a metal corrosion inhibitor was slowly added to the blender jar. During this addition, the blender speed was increased to approximately 50%, and after all of the acid had been added to the blender jar, mixing at the 50% speed was continued for an additional 5 minutes. The emulsion formed immediately after mixing and was observed for its appearance as it was poured from the blender jar into the cup of a Fann model 35 viscometer. If the emulsion inverted while it was being mixed, or if the emulsion started breaking before viscosity measurements could be taken, those observations were noted. The Fann model 35 viscometer was equipped with a No. 1 bob, sleeve, and spring, and dial readings were taken at 600, 300, 200 and 100 rpm. The stability of each emulsion was observed based on the appearance of the emulsion after remaining undisturbed for 12 to 18 hours.

The various emulsifiers, fatty amines, fatty acids, quantities of components, viscosity readings and observations are set forth in Table VI below. The code letters used in Table VI for the fatty amines used, the emulsifiers used, the fatty acids used, the appearance of the emulsions after mixing and the appearance of the emulsions after remaining static are set forth in Tables I-V, respectively.

TABLE I

| Letter Designation | Fatty Amine Description | Manufacturer[1] Trade Designation |
|---|---|---|
| F | coco amine acetate | Armac ® C |
| G | tallow acetate | Armac ® T |
| H | (hydrogenated-tallow) amine acetate | Armac ® HT |
| I | distilled dodecylamine | Armeen ® 12D |
| J | distilled tetradecylamine | Armeen ® 14D |
| K | distilled hexadecylamine | Armeen ® 16D |
| L | distilled octadecylamine | Armeen ® 18D |
| M | distilled N,N-dimethyl-cocoamine | Armeen ® DMCD |
| N | distilled N,N-dimethyl-soyaamine | Armeen ® DMSD |
| O | dimethyl tallow amine | Armeen ® DMDT |
| P | methyl dicocoamine | Armeen ® M2C |
| Q | (hydrogenated tallow) amine | Armeen ® HTD |
| R | N,N-dimethyloctadecylamine | Armeen ® NDM18D |
| S | methyl di(hydrogenated tallow) amine | Armeen ® M2HT |
| T | di(hydrogenated tallow) amine | Armeen ® 2HT |
| U | decyclamine | Armeen ® 10 |
| V | aliphatic amine | Armeen ® aliphatic amine |
| W | dicocoamine | Armeen ® 2C |
| X | N-coco-N-benzyi amine | Armeen ® CB |
| Y | oleylamine | Armeen ® O |
| Z | C12-C15 ether amine, 2 moles E.O. | Armeen ® EA-25 |
| AA | C8-C10 ether amine, 2 moles E.O. | Armeen ® EA-80 |
| AB | short chain amine | Armeen ® L-8D |
| AC | tallow amine | Armeen ® T |
| AD | N-coco-3-aminobutanoic acid | Armeen ® Z |
| AE | coco amine | Armeen ® C |

[1]Akzo Chemicals Inc. of Chicago, Illinois.

TABLE II

| Letter Designation | Emulsifier Description | Manufacturer Trade Designation |
|---|---|---|
| AF | oleic diethanol amide | Witcamide ® 511[1] |
| AG | oleic diethanol amide | Witcamide ® 511H[1] |
| AH | blend of amphoteric amine salt, phosphate ester, ethoxylated dialkyl phenol, propylene glycol ether | Ethox KK8-001[2] |

[1]Witco Chemical Corporation of Houston, Texas.
[2]Ethox Chemicals Inc. of Greenville, South Carolina.

TABLE III

Designations of Fatty Acids Used in Tests

| Letter Designation | Fatty Acid Description | Manufacturer[1] Trade Designation |
|---|---|---|
| A | Distilled Coco | Neo-Fat ® 265 |
| B | Commercially Pure Stearic | Neo-Fat ® 18 |
| C | Distilled Animal | Neo-Fat ® 65 |
| D | Caprylic | Neo-Fat ® 8-S |
| E | Crystallized Red Oil | Neo-Fat ® 94-06 |

[1]Akzo Chemicals Inc. of Chicago, Illinois.

TABLE IV

Designations of Appearance of Emulsions After Mixing

| Letter Designation | Description of Appearance |
|---|---|
| BA | Uniform creamy emulsion |
| BB | Uniform creamy emulsion, but thin |
| BC | Emulsifier/amine combination had to be melted before use |
| BD | Emulsion inverted to water external while being mixed |
| BE | Thin unstable emulsion |
| BF | Emulsion separated before viscosity readings could be taken |
| BG | Uniform creamy emulsion, but thick |

TABLE V

Designations of Appearance of Emulsions After Being Static for 12 to 18 Hours

| Letter Designation | Description of Appearance |
|---|---|
| CA | Acid broke out of emulsion after 2 hours |
| CB | Nearly total separation after 12–18 hours |
| CC | Emulsion remained homogenous |
| CD | 10–20 ml acid separated after 12–18 hours |
| CE | Slight acid separation after 12–18 hours |
| CF | ⅛–⅝ of acid separated after 12–18 hours |

TABLE VI

| | | | | | Acid-In-Oil Emulsion Tests | | | | | | | |
|---|---|---|---|---|---|---|---|---|---|---|---|---|
| Test No. | Fatty Amine Used | Quantity of Amine Used ml | Emulsifier Used | Quantity of Emulsifier Used, ml | Concentration of Emulsifier, Fatty Amine, Glacial Acetic Acid and Isopropyl Alcohol In Emulsion, % by Volume of Emulsion | Fatty Acid Used | Concentration of Fatty Acid in Emulsion, % by Volume of Emulsion | Appearance of Emulsion After Mixing | Viscometer Dial Readings | | | Appearance of Emulsion After 12-18 Hours |
| | | | | | | | | | 600 rpm | 300 rpm | 200 rpm | 100 rpm | |
| 1 | AE | 5 | AF | 5 | 1.0 | A | 1.0 | BA | 87.0 | 53.0 | 38.5 | 23.0 | CC |
| 2 | AE | 5 | AF | 5 | 1.0 | A | .80 | BA | 81.5 | 50.5 | 37.5 | 22.5 | CC |
| 3 | AE | 5 | AF | 5 | 1.0 | A | .60 | OA | 85.5 | 52.5 | 38.5 | 23.0 | CC |
| 4 | AE | 5 | AF | 5 | 1.0 | A | .40 | BA | 86.5 | 52.5 | 38.0 | 22.5 | CC |
| 5 | AE | 5 | AF | 5 | 1.0 | A | .20 | BA | 89.5 | 54.5 | 39.5 | 22.5 | CC |
| 6 | AE | 5 | AF | 5 | 1.0 | — | — | BA | 67.5 | 39.5 | 28.0 | 15.5 | CC |
| 7 | AE | 5 | AF | 5 | 1.0 | A | 1.20 | BA | 84.0 | 50.5 | 37.0 | 22.0 | CC |
| 8 | AE | 5 | AF | 5 | 1.0 | A | 1.40 | BA | 97.0 | 60.0 | 46.0 | 28.5 | CC |
| 9 | AE | 5 | AF | 5 | 1.0 | A | .30 | BA | 92.5 | 55.0 | 39.5 | 22.0 | CC |
| 10 | AE | 5 | AF | 5 | 1.0 | A | .10 | BA | 92.5 | 55.0 | 39.0 | 20.5 | CC |
| 11 | AE | 5 | AF | 5 | 1.0 | A | .60 | BA | 73.5 | 44.0 | 31.5 | 18.0 | CC |
| 12 | AE | 5 | AF | 5 | .60 | A | .40 | BA | 64.5 | 38.0 | 27.0 | 15.5 | CC |
| 13 | AE | 5 | AF | 5 | .60 | A | .20 | BA | 62.0 | 36.0 | 25.5 | 14.5 | CC |
| 14 | AE | 5 | AF | 5 | .60 | — | — | BA | 56.5 | 34.0 | 24.0 | 13.5 | CD |
| 15 | AE | 5 | AF | 5 | .40 | A | .60 | BB | 49.0 | 29.5 | 21.0 | 12.5 | CE |
| 16 | AE | 5 | AF | 5 | .40 | A | .40 | BB | 47.5 | 28.0 | 20.0 | 11.0 | CF |
| 17 | AE | 5 | AF | 5 | .40 | A | .20 | BB | 48.5 | 28.5 | 20.0 | 11.0 | CF |
| 18 | AE | 5 | AF | 5 | .40 | — | — | BB | 39.0 | 23.0 | 16.5 | 9.5 | CA |
| 19 | AE | 5 | AF | 5 | .20 | A | .60 | BB | 35.5 | 23.0 | 16.5 | 0.5 | CA |
| 20 | AE | 5 | AF | 5 | .20 | A | .40 | BB | 32.5 | 21.0 | 15.5 | 9.0 | CA |
| 21 | AE | 5 | AF | 5 | .20 | A | .20 | BB | 34.5 | 22.0 | 16.0 | 9.0 | CA |
| 22 | AE | 5 | AF | 5 | .20 | — | — | BB | 25.5 | 16.5 | 12.5 | 7.5 | CB |
| 23 | AE | 5 | AF | 5 | .60 | B | .20 | BA | 72.0 | 42.5 | 30.5 | 17.5 | CC |
| 24 | AE | 5 | AF | 5 | .60 | B | .40 | BA | 66.0 | 38.5 | 27.5 | 16.0 | CC |
| 25 | AE | 5 | AF | 5 | .60 | B | .60 | BA | 58.5 | 34.5 | 25.0 | 15.0 | CC |
| 26 | AE | 5 | AF | 5 | .60 | B | .80 | BA | 74.0 | 43.5 | 32.0 | 19.0 | CC |
| 27 | AE | 5 | AF | 5 | .60 | B | 1.0 | BA | 71.5 | 41.5 | 30.5 | 18.5 | CC |
| 28 | AE | 5 | AF | 5 | .60 | C | .20 | BA | 73.5 | 43.5 | 31.5 | 18.0 | CC |
| 29 | AE | 5 | AF | 5 | .60 | C | .40 | BA | 71.5 | 42.0 | 30.0 | 17.5 | CC |
| 30 | AE | 5 | AF | 5 | .60 | C | .60 | BA | 78.5 | 46.0 | 33.0 | 18.5 | CC |
| 31 | AE | 5 | AF | 5 | .60 | C | .80 | BA | 73.0 | 42.0 | 30.0 | 17.5 | CC |
| 32 | AE | 5 | AF | 5 | .60 | C | 1.0 | BA | 88.0 | 51.0 | 36.0 | 20.0 | CC |
| 33 | AE | 5 | AF | 5 | .60 | D | .20 | BA | 57.5 | 34.0 | 24.0 | 13.5 | CC |
| 34 | AE | 5 | AF | 5 | .60 | D | .40 | BA | 59.5 | 35.0 | 25.0 | 14.5 | CC |
| 35 | AE | 5 | AF | 5 | .60 | D | .60 | BA | 58.5 | 34.5 | 24.5 | 14.0 | CC |
| 36 | AE | 5 | AF | 5 | .60 | D | .90 | BA | 63.0 | 37.0 | 26.5 | 15.0 | CC |
| 37 | AE | 5 | AF | 5 | .60 | D | 1.0 | BA | 63.5 | 36.5 | 25.5 | 14.5 | CC |
| 38 | AE | 5 | AF | 5 | .60 | E | .20 | BA | 67.0 | 39.5 | 28.5 | 16.5 | CC |
| 39 | AE | 5 | AF | 5 | .60 | E | .40 | BA | 67.5 | 39.5 | 28.0 | 16.0 | CC |
| 40 | AE | 5 | AF | 5 | .60 | E | .60 | BA | 67.5 | 39.5 | 28.5 | 16.5 | CC |
| 41 | AE | 5 | AF | 5 | .60 | E | .80 | BA | 68.5 | 40.5 | 29.5 | 17.0 | CC |
| 42 | AE | 5 | AF | 5 | .60 | E | 1.0 | BA | 72.5 | 41.5 | 30.0 | 17.5 | CC |
| 43 | I | 5 | AF | 5 | .60 | A | .20 | BA | 61.0 | 35.5 | 25.5 | 14.5 | CC |
| 44 | J | 4 | AF | 5 | .60 | A | .20 | BA | 57.0 | 33.5 | 23.5 | 13.5 | CC |
| 45 | J | 5 | AF | 5 | .60 | A | .20 | BA | 73.5 | 43.5 | 31.5 | 18.5 | CC |

TABLE VI-continued

Acid-In-Oil Emulsion Tests

| Test No. | Fatty Amine Used | Quantity of Amine Used ml | Emulsifier Used | Quantity of Emulsifier Used, ml | Concentration of Emulsifier; Fatty Amine, Glacial Acetic Acid and Isopropyl Alcohol In Emulsion, % by Volume of Emulsion | Fatty Acid Used | Concentration of Fatty Acid in Emulsion, % by Volume of Emulsion | Appearance of Emulsion After Mixing | Viscometer Dial Readings | | | | Appearance of Emulsion After 12-18 Hours |
|---|---|---|---|---|---|---|---|---|---|---|---|---|---|
| | | | | | | | | | 600 rpm | 300 rpm | 200 rpm | 100 rpm | |
| 46 | J | 6 | AF | 5 | .60 | A | .20 | BA | 72.5 | 42.5 | 30.5 | 17.5 | CC |
| 47 | K | 5 | AF | 5 | .60 | A | .20 | BA, BC | 64.5 | 37.5 | 26.5 | 15.5 | CF |
| 48 | K | 6 | AF | 5 | .60 | A | .20 | BA, BC | 76.5 | 45.0 | 33.0 | 19.5 | CF |
| 49 | K | 7 | AF | 5 | .60 | A | .20 | BA, BC | 74.5 | 44.5 | 32.5 | 19.5 | CF |
| 50 | L | 6 | AF | 5 | .60 | A | .20 | BA, BC | 93.0 | 57.0 | 42.0 | 25.5 | CD |
| 51 | L | 7 | AF | 5 | .60 | A | .20 | BA, BC | 103.5 | 62.5 | 45.5 | 27.0 | CF |
| 52 | L | 8 | AF | 5 | .60 | A | .20 | BA, BC | 108.0 | 65.5 | 47.0 | 28.0 | CD |
| 53 | M | 5.5 | AF | 5 | .60 | A | .20 | BD | — | — | — | — | — |
| 54 | M | 6 | AF | 5 | .60 | A | .20 | BD | — | — | — | — | — |
| 55 | N | 7 | AF | 5 | .60 | A | .20 | BD | — | — | — | — | — |
| 56 | N | 8 | AF | 5 | .60 | A | .20 | BE | 28.5 | 15.5 | 11.5 | 7.0 | CA |
| 57 | N | 9 | AF | 5 | .60 | A | .20 | BE | 26.5 | 16.0 | 12.5 | 8.0 | CA |
| 58 | N | 5 | AF | 5 | .60 | A | .20 | BF | — | — | — | — | — |
| 59 | O | 9 | AF | 5 | .70 | A | .20 | BF | — | — | — | — | — |
| 60 | O | 7 | AF | 5 | .60 | A | .20 | BF | — | — | — | — | — |
| 61 | O | 8 | AF | 5 | .60 | A | .20 | BF | — | — | — | — | — |
| 62 | O | 9 | AF | 5 | .60 | A | .20 | BF | — | — | — | — | — |
| 63 | O | 5 | AF | 5 | .60 | A | .20 | BE | 24.0 | 14.5 | 11.5 | 7.0 | CA |
| 64 | P | 9 | AF | 5 | .70 | A | .20 | BP | — | — | — | — | — |
| 65 | P | 10 | AF | 5 | .90 | A | .20 | BG | 121.0 | 80.0 | 61.5 | 39.0 | CC |
| 66 | P | 10 | AF | 5 | .90 | A | .20 | BG | 138.5 | 94.0 | 73.5 | 48.5 | CC |
| 67 | O | 5 | AF | 5 | .60 | A | .20 | BA | 84.0 | 52.0 | 38.5 | 23.5 | CC |
| 68 | Q | 7 | AF | 5 | .60 | A | .20 | BA, BC | 82.0 | 49.5 | 36.0 | 21.5 | CF |
| 69 | Q | 9 | AF | 5 | .60 | A | .20 | BA, BC | 79.5 | 48.0 | 35.5 | 20.5 | CF |
| 70 | Q | 7 | AF | 5 | .70 | A | .20 | BA, BC | 81.5 | 48.5 | 35.5 | 20.5 | CD |
| 71 | Q | 8 | AF | 5 | .60 | A | .20 | BA, BC | 74.5 | 45.5 | 33.0 | 19.0 | CF |
| 72 | R | 9 | AF | 5 | .60 | A | .20 | BF | — | — | — | — | — |
| 73 | R | 5 | AF | 5 | .60 | A | .20 | BF | — | — | — | — | — |
| 74 | R | 6 | AF | 5 | .60 | A | .20 | BF | — | — | — | — | — |
| 75 | R | 7 | AF | 5 | .60 | A | .20 | BA | 54.0 | 30.0 | 20.0 | 12.0 | CA |
| 76 | R | 8 | AF | 5 | .60 | A | .20 | BA | 72.0 | 36.5 | 24.0 | 13.0 | CF |
| 77 | S | 8 | AF | 5 | .80 | A | .20 | BA | 49.0 | 27.0 | 19.0 | 11.0 | CA |
| 78 | S | 7 | AF | 5 | .70 | A | .20 | BG, BC | 107.5 | 68.0 | 50.0 | 30.5 | CF |
| 79 | S | 14 | AF | 5 | .60 | A | .20 | BG, BC | 204.5 | 146.5 | 118.0 | 83.5 | CC |
| 80 | S | 14 | AF | 5 | 1.20 | A | .20 | BG, BC | 99.0 | 60.5 | 44.5 | 27.0 | CC |
| 81 | S | 15 | AF | 5 | .60 | A | .20 | BG, BC | 187.5 | 134.0 | 108.0 | 75.5 | CF |
| 82 | T | 15 | AF | 5 | 1.20 | A | .20 | BA, BC | 74.0 | 43.0 | 31.0 | 19.0 | CD |
| 83 | T | 5 | AF | 5 | .60 | A | .20 | BB, BC | 40.0 | 22.5 | 15.0 | 6.5 | CF |
| 84 | T | 14 | AF | 5 | 1.20 | A | .20 | BB, BC | 96.0 | 58.5 | 44.0 | 27.0 | CE |
| 85 | T | 14 | AF | 5 | .60 | A | .20 | BF, BC | — | — | — | — | CC |
| 86 | U | 5 | AF | 5 | .60 | A | .20 | BB | 30.5 | 16.5 | 11.5 | 5.5 | CA |
| 87 | U | 4 | AF | 5 | .60 | A | .20 | BB | 31.5 | 19.5 | 14.5 | 8.5 | CF |
| 88 | U | 4.5 | AF | 5 | .60 | A | .20 | BB | 34.0 | 20.5 | 14.5 | 8.5 | CA |
| 89 | U | 5 | AF | 5 | .60 | A | .20 | BA | 80.0 | 48.0 | 35.0 | 20.5 | CA |
| 90 | V | 5 | AF | 5 | .60 | A | .20 | BA | 80.0 | 48.0 | 35.0 | 20.5 | CC |

TABLE VI-continued

Acid-In-Oil Emulsion Tests

| Test No. | Fatty Amine Used | Quantity of Amine Used ml | Emulsifier Used | Quantity of Emulsifier Used, ml | Concentration of Emulsifier, Fatty Amine, Glacial Acetic Acid and Isopropyl Alcohol In Emulsion, % by Volume of Emulsion | Fatty Acid Used | Concentration of Fatty Acid in Emulsion, % by Volume of Emulsion | Appearance of Emulsion After Mixing | Viscometer Dial Readings 600 rpm | 300 rpm | 200 rpm | 100 rpm | 5 | Appearance of Emulsion After 12–18 Hours |
|---|---|---|---|---|---|---|---|---|---|---|---|---|---|---|
| 91 | W | 5 | AF | 5 | .60 | A | .20 | BB | 34.5 | 18.0 | 11.0 | 5 |  | CC |
| 92 | W | 9 | AF | 5 | .60 | A | .20 | BA | 60.0 | 41.5 | 32.0 | 22.5 |  | CC |
| 93 | W | 9 | AF | 5 | .90 | A | .20 | BA | 102.0 | 65.0 | 41.0 | 24.5 |  | CC |
| 94 | W | 10 | AF | 5 | .60 | A | .20 | BA | 81.0 | 46.0 | 31.5 | 20.5 |  | CC |
| 95 | W | 10 | AF | 5 | .96 | A | .20 | BG | 165.0 | 115.0 | 90.0 | 67.0 |  | CA |
| 96 | X | 5 | AF | 5 | .60 | A | .20 | BB | 38.5 | 22.5 | 15.5 | 9.5 |  | CC |
| 97 | Y | 5 | AF | 5 | .60 | A | .20 | BA | 91.5 | 55.0 | 40.0 | 23.5 |  | CC |
| 98 | Y | 7 | AF | 5 | .60 | A | .20 | BA | 92.0 | 49.0 | 35.5 | 20.5 |  | CC |
| 99 | Y | 7 | AF | 5 | .70 | A | .20 | BA | 88.5 | 53.0 | 38.5 | 22.5 |  | CC |
| 100 | Y | 7.5 | AF | 5 | .60 | A | .20 | BA | 82.5 | 49.0 | 35.5 | 20.5 |  | CC |
| 101 | Y | 7.5 | AF | 5 | .70 | A | .20 | BA | 98.5 | 59.5 | 43.5 | 25.5 |  | CC |
| 102 | Z | 5 | AF | 5 | .60 | A | .20 | BD | — | — | — | — |  | — |
| 103 | AA | 5 | AF | 5 | .60 | A | .20 | BD | — | — | — | — |  | — |
| 104 | AB | 3 | AF | 5 | .50 | A | .20 | BE | 23.0 | 15.5 | 12.0 | 6.5 |  | CB |
| 105 | AB | 3 | AF | 5 | .60 | A | .20 | BE | 27.5 | 18.5 | 13.5 | 7.5 |  | CB |
| 106 | AB | 4 | AF | 5 | .50 | A | .20 | BE | 22.0 | 17.0 | 13.5 | 9.0 |  | CB |
| 107 | AB | 4 | AF | 5 | .60 | A | .20 | BE | 24.5 | 16.0 | 11.5 | 5.5 |  | CB |
| 108 | AC | 5 | AF | 5 | .60 | A | .20 | BA, BC | 85.6 | 52.0 | 38.5 | 22.5 |  | CC |
| 109 | AC | 7 | AF | 5 | .60 | A | .20 | BA, BC | 75.5 | 45.5 | 33.5 | 19.0 |  | CC |
| 110 | AC | 7 | AF | 5 | .70 | A | .20 | BA, BC | 77.5 | 46.5 | 33.0 | 19.0 |  | CC |
| 111 | AC | 7.5 | AF | 5 | .60 | A | .20 | BA, BC | 74.5 | 43.5 | 31.5 | 18.0 |  | CC |
| 112 | AC | 7.5 | AF | 5 | .70 | A | .20 | BA, BC | 88.5 | 53.0 | 38.5 | 22.5 |  | CC |
| 113 | AD | 5 | AF | 5 | .60 | A | .20 | BB | 34.5 | 21.5 | 15.5 | 9.0 |  | CF |
| 114 | AD | 6 | AF | 5 | .60 | A | .20 | BB | 34.5 | 21.0 | 15.5 | 9.0 |  | CF |
| 115 | AD | 7 | AF | 5 | .70 | A | .20 | BB | 35.5 | 21.5 | 16.0 | 9.5 |  | CF |
| 116 | AD | 7 | AF | 5 | .60 | A | .20 | BA | 76.0 | 45.0 | 32.5 | 19.5 |  | CC |
| 117 | AE | 5 | AG | 5 | .60 | A | .20 | BB | 46.0 | 27.0 | 18.5 | 9.5 |  | CE |
| 118 | AE | 5 | AH | 5 | .50 | A | .26 | BA | 71.5 | 43.0 | 31.5 | 18.5 |  | CC |
| 119 | AE | 5 | AG | 5 | .40 | A | .15 | BB | 56.0 | 34.0 | 25.0 | 14.5 |  | CC |
| 120 | AE | 5 | AG | 5 | .30 | A | .10 | BB | 45.5 | 27.5 | 20.0 | 11.5 |  | CC |
| 121 | F | 5 | AF | 5 | .60 | A | .20 | BA | 59.0 | 34.5 | 24.0 | 13.0 |  | CC |
| 122 | G | 9 | AF | 5 | .60 | A | .20 | DA | 64.5 | 37.5 | 26.5 | 14.0 |  | CC |
| 123 | H | 9 | AF | 5 | .60 | A | .20 | BA, BC | 81.0 | 48.0 | 35.0 | 20.0 |  | CE |

From the test results given in Table VI, it can be seen that the surfactant system of this invention is effective in producing low viscosity, stable acid-in-oil emulsions, and that the low viscosity acid-in-oil emulsions of the invention are particularly well suited for carrying out acidizing methods of stimulating hydrocarbon production from subterranean formations.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A surfactant system for preparing a low viscosity acid-in-oil emulsion comprising:
   an emulsifying agent comprising oleic diethanol amide and present in an amount sufficient to form and stabilize an acid-in-oil emulsion; and
   an emulsion viscosity reducing agent comprising a fatty ammonium salt of a fatty acid.

2. The surfactant system of claim 1 wherein said emulsion viscosity reducing agent has the structural formula:

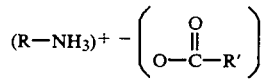

wherein R and R' are the same or different saturated or unsaturated aliphatic groups having in the range of from about 8 to about 22 carbon atoms.

3. The surfactant system of claim 2 wherein said emulsion viscosity reducing agent is present in said system in an amount in the range of from about 5% to about 9.5% by volume of said system excluding any solvent or solvents present.

4. The surfactant system of claim 3 wherein said emulsion viscosity reducing agent is the coco ammonium salt of coco fatty acid.

5. The surfactant system of claim 1 wherein said emulsifying agent is present in said system in an amount in the range of from about 5% to about 95% by volume of said system excluding any solvent or solvents present.

6. The surfactant system of claim 1 wherein said emulsifying agent is present in said system in an amount of about 30% by volume of said system excluding any solvent or solvents present, and said emulsion viscosity reducing agent is the coco ammonium salt of coco fatty acid present in said system in an amount of about 70% by volume of said system excluding any solvent or solvents present.

7. An acid-in-oil emulsion comprising:
   a hydrocarbon oil forming the external phase of said emulsion present in said emulsion in an amount in the range of from about 5% to about 48% by volume thereof;
   an emulsifying agent of a type which forms and stabilizes an acid-in-oil emulsion present in said emulsion in an amount in the range of from about 0.01% to about 2.0% by volume thereof;
   an emulsion viscosity reducing agent comprising a fatty ammonium salt of a fatty acid present in said emulsion in an amount in the range of from about 0.01% to about 2.0% by volume thereof; and
   an aqueous acid solution forming the internal phase of said emulsion present in said emulsion in an amount in the range of from about 5% to about 48% by volume thereof.

8. The emulsion of claim 7 wherein said hydrocarbon oil forming the external phase thereof is selected from the group consisting of kerosene, diesel oil, lease crude and naphtha.

9. The emulsion of claim 7 wherein said emulsifying agent is selected from the group consisting of fatty alkanol amides and a blend of an amphoteric amine salt, a phosphate ester, an ethoxylated dialkyl phenol and a propylene glycol ether.

10. The emulsion of claim 7 wherein said emulsion viscosity reducing agent has the structural formula:

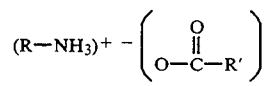

wherein R and R' are the same or different saturated or unsaturated aliphatic groups having in the range of from about 8 to about 22 carbon atoms.

11. The emulsion of claim 7 wherein the acid in said aqueous acid solution is selected from the group consisting of acetic acid, formic acid, hydrochloric acid and mixtures of such acids.

12. The emulsion of claim 7 wherein said hydrocarbon oil is kerosene, said emulsifying agent is oleic diethanol amide, said emulsion viscosity reducing agent is the coco ammonium salt of coco fatty acid and said aqueous acid solution is a hydrochloric acid solution.

13. A method of reducing the viscosity of a surfactant stabilized acid-in-oil emulsion comprising combining an emulsion viscosity reducing agent with said emulsion in an amount in the range of from about 0.01% to about 2.0% by volume of said emulsion, said emulsion viscosity reducing agent being comprised of a fatty ammonium salt of a fatty acid.

14. The method of claim 13 wherein said emulsion viscosity reducing agent has the structural formula:

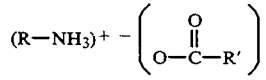

wherein R and R' are the same or different saturated or unsaturated aliphatic groups having in the range of from about 8 to about 22 carbon atoms.

15. The method of claim 14 wherein R and R' are the same or different, R is a saturated aliphatic group having in the range of from about 8 to about 22 carbon atoms and R' is a saturated aliphatic group having in the range of from about 8 to about 22 carbon atoms.

16. The method of claim 15 wherein said emulsion viscosity reducing agent is the coco ammonium salt of coco fatty acid.

* * * * *